(12) United States Patent
Donath et al.

(10) Patent No.: US 12,246,597 B2
(45) Date of Patent: Mar. 11, 2025

(54) SNOWPLOW DRIVER ASSIST SYSTEM

(71) Applicant: Regents of the University of Minnesota, Minneapolis, MN (US)

(72) Inventors: Max Donath, Minneapolis, MN (US); Brian Davis, Minneapolis, MN (US); Chen-Fu Liao, Minneapolis, MN (US); Nichole Morris, Minneapolis, MN (US); Katelyn Schwieters, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 81 days.

(21) Appl. No.: 18/312,247

(22) Filed: May 4, 2023

(65) Prior Publication Data
US 2023/0406103 A1 Dec. 21, 2023

Related U.S. Application Data

(60) Provisional application No. 63/343,208, filed on May 18, 2022.

(51) Int. Cl.
*B60K 35/00* (2024.01)
*B60K 35/22* (2024.01)
(Continued)

(52) U.S. Cl.
CPC ............. *B60K 35/00* (2013.01); *B60K 35/22* (2024.01); *B60K 35/28* (2024.01); *B60K 35/29* (2024.01);
(Continued)

(58) Field of Classification Search
CPC .. B60K 35/00; B60K 35/81; B60K 2360/178; B60K 35/28; B60K 2360/166; B60K 35/29; B60K 2360/188; B60K 35/22
See application file for complete search history.

(56) References Cited

U.S. PATENT DOCUMENTS 5,717,593 A * 2/1998 Gvili .................... G05D 1/0083
701/454
6,977,630 B1 * 12/2005 Donath ................ G01C 21/365
345/9

(Continued)

OTHER PUBLICATIONS

AutonomouStuff. (2023). Aptiv ESR 2.5. Retrieved Mar. 2023 from, https://autonomoustuff.com/products/aptiv-esr-2-5-24v, 1 page.
(Continued)

*Primary Examiner* — Chico A Foxx
(74) *Attorney, Agent, or Firm* — Theodore M. Magee; Westman, Champlin & Koehler, P.A.

(57) ABSTRACT

A system includes a display and a processor coupled to the display. The processor determines a position of a vehicle relative to a road lane and causes the display to depict a set of position indicators to convey the position of the vehicle relative to the road lane. In one state, the set of position indicators include a plurality of empty shape outlines and at least one filled shape outline. The processor also determines a position of a hazard relative to the vehicle and causes the display to depict a set of hazard position indicators to convey the position of the hazard relative to the vehicle. In one state, the set of hazard position indicators include a plurality of empty shape outlines and at least one filled shape outline.

17 Claims, 15 Drawing Sheets

(51) Int. Cl.
*B60K 35/28* (2024.01)
*B60K 35/29* (2024.01)
*B60K 35/81* (2024.01)

(52) U.S. Cl.
CPC ........ *B60K 35/81* (2024.01); *B60K 2360/166* (2024.01); *B60K 2360/178* (2024.01); *B60K 2360/188* (2024.01)

(56) References Cited

U.S. PATENT DOCUMENTS

| | | | | |
|---|---|---|---|---|
| 7,209,221 | B2* | 4/2007 | Breed | G01S 17/04 356/28 |
| 10,604,139 | B2* | 3/2020 | Oyama | B60K 35/10 |
| 11,697,346 | B1* | 7/2023 | Weiss | G08G 1/167 345/589 |
| 2002/0072851 | A1* | 6/2002 | Ahearn | A01B 69/007 340/988 |
| 2007/0139176 | A1* | 6/2007 | Victor | G01C 21/3697 701/301 |
| 2008/0016442 | A1* | 1/2008 | Khoo | G06Q 30/02 715/700 |
| 2008/0275618 | A1* | 11/2008 | Grimm | G08G 1/162 701/96 |
| 2010/0123778 | A1* | 5/2010 | Hada | G08G 1/162 348/148 |
| 2013/0080052 | A1* | 3/2013 | Gooding | G01C 21/3407 701/400 |
| 2015/0314783 | A1* | 11/2015 | Nespolo | B60W 30/0953 701/301 |
| 2017/0057503 | A1* | 3/2017 | Cho | B60W 50/085 |
| 2018/0079578 | A1* | 3/2018 | Agersbæk | B65D 79/02 |
| 2018/0178839 | A1* | 6/2018 | Ide | B62D 15/029 |
| 2018/0328752 | A1* | 11/2018 | Tomatsu | G06T 19/006 |
| 2020/0242942 | A1* | 7/2020 | Gilbert | G08G 1/0125 |
| 2022/0171590 | A1* | 6/2022 | Seitz | B60K 35/10 |
| 2022/0324444 | A1* | 10/2022 | Germain | B62D 15/025 |
| 2022/0363251 | A1* | 11/2022 | Shin | G06V 20/588 |
| 2024/0059309 | A1* | 2/2024 | Kamiya | G06T 11/00 |

OTHER PUBLICATIONS

Laser Guidance Systems by LaserLine Mfg. (road striping or snow plowing), https://laserlinemfg.com/product/gl3000pmc-wing-tow-plow-guidance-laser/, 2021, 1 page.

Liao, CTS Center for Transportation Studies, Development of Driver Assistance Systems to Support Snowplow Operations, 2018, 134 pages.

Light bar guidance aids—http://www2.ca.uky.edu/agcomm/pubs/pa/pa3/pa3.pdf, 2002, 2 pages.

Minnesota Department of Transportation. (2023). MnCORS GNSS Network. Retrieved Mar. 2023 from https://www.dot.state.mn.us/surveying/cors/, 1 page.

Precision GPS farming lightbar, https://www.messicks.com/part/ztn92000-60/ez-guide-250-precision-farming-gps-lightbar, 2023, 1 page.

PLM—A lightbar based guidance system provides you with visual feedback to keep you on your Iintended path, http://web.archive.org/web/20220517032233/https://agriculture.newholland.com/nar/en-us/precision-and-management/products/guidance-steering/manual-guidance-lightbar, 2022, 1 page.

Raspberry Pi Foundation. (2023). Raspberry Pi. Retrieved Mar. 2023 from https://raspberrypi.org, 1 page.

Redis Ltd. (2023). Redis. Retrieved Mar. 2023 from https://redis.io, 1 page.

Swift Navigation. (2023). Duro Inertial Ruggedized Receiver. Retrieved Mar. 2023 from https://www.swiftnav.com/duro-inertial, 1 page.

Guidance and steering by TeeJet, https://www.teejet.com/precision_farming/guidance.aspx, 20203, 1 page.

Precision farming tools—https://vtechworks.lib.vt.edu/bitstream/handle/10919/51374/442-501.pdf, 2009, 7 page.

* cited by examiner

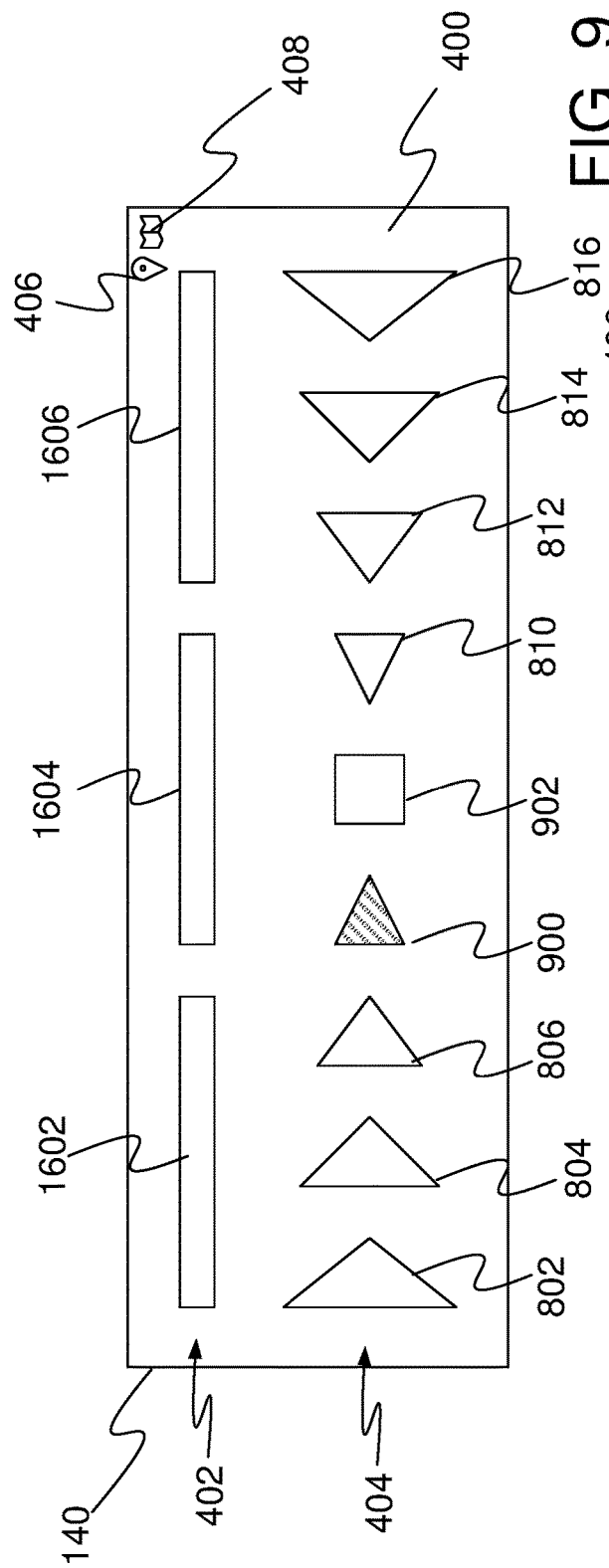

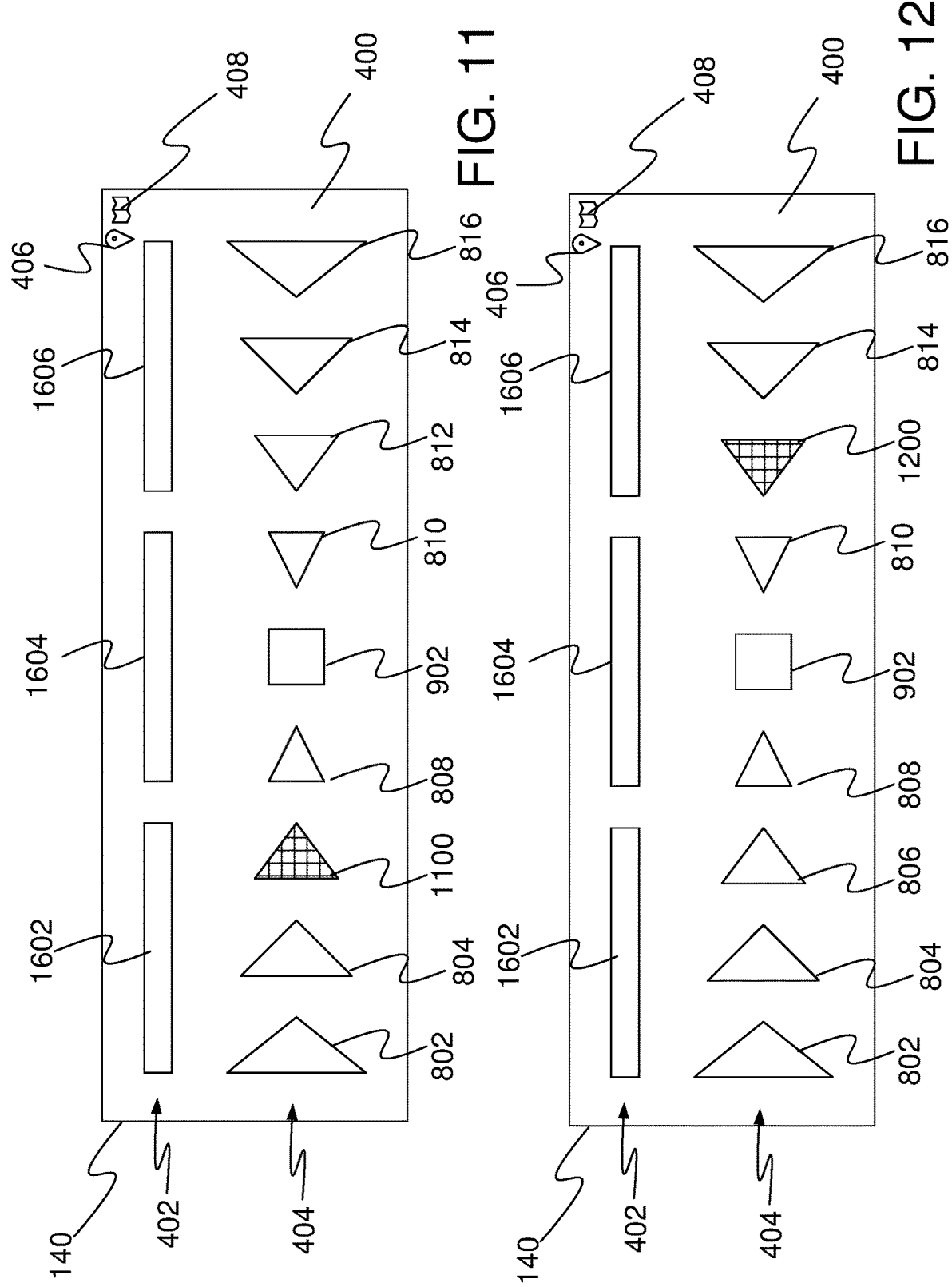

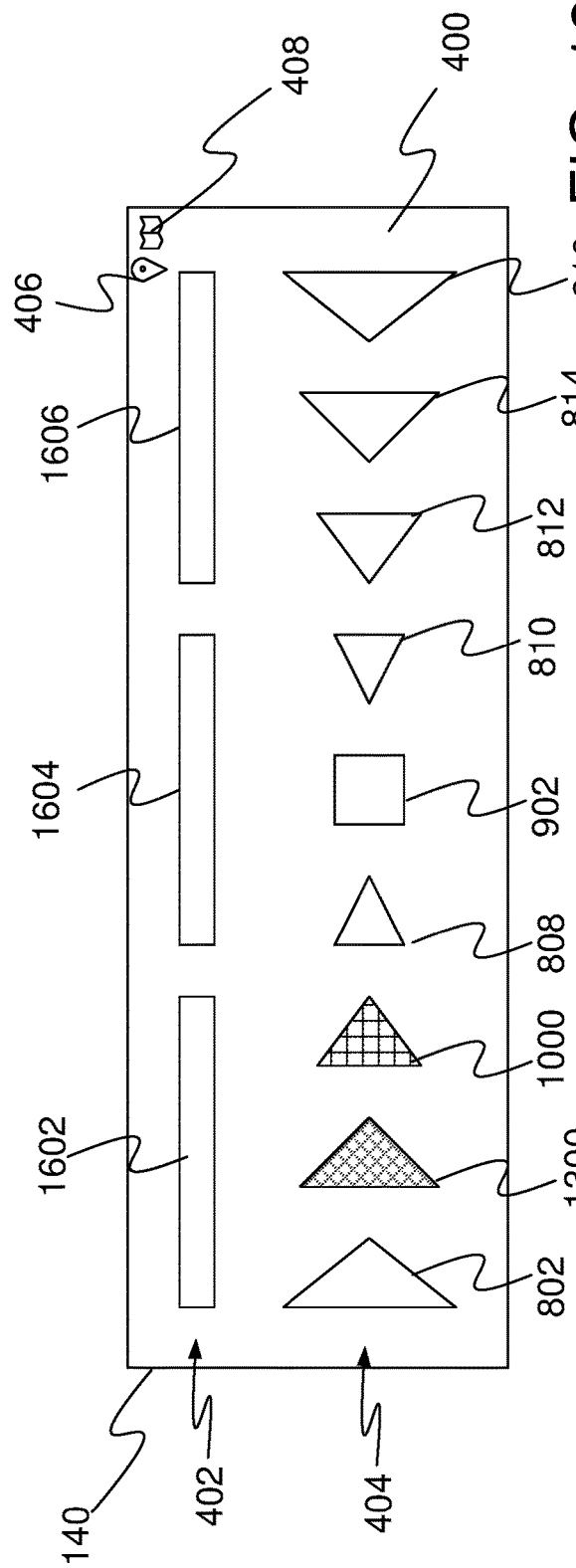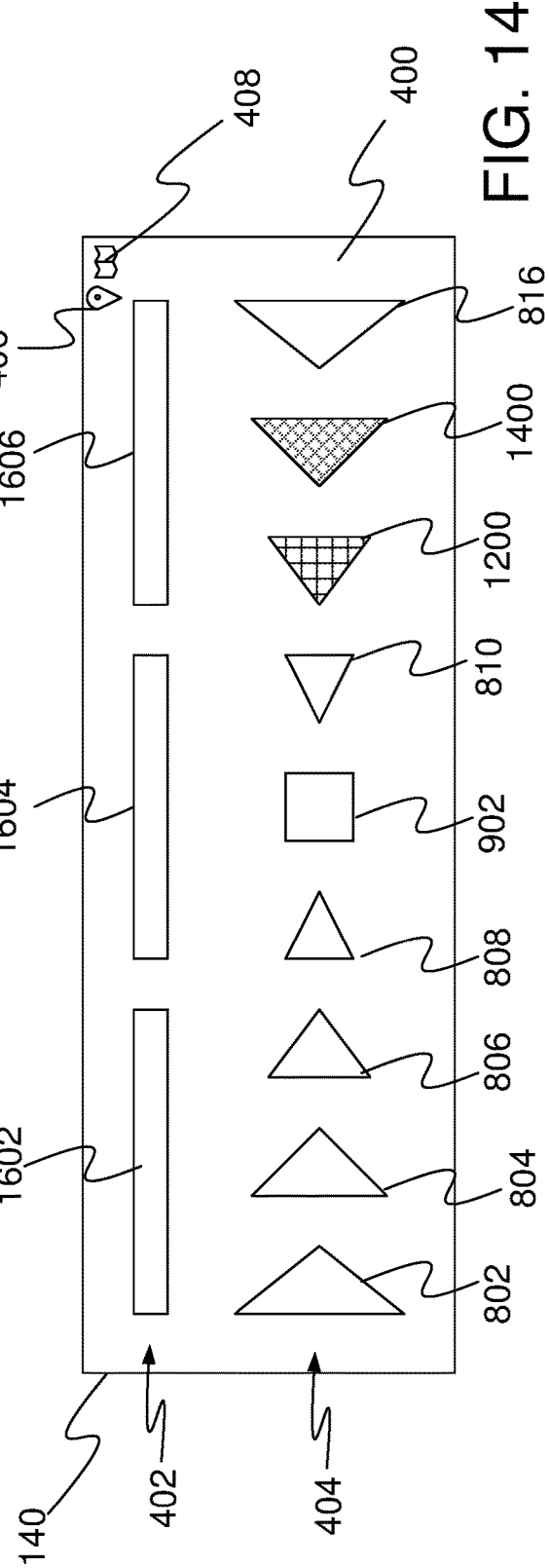

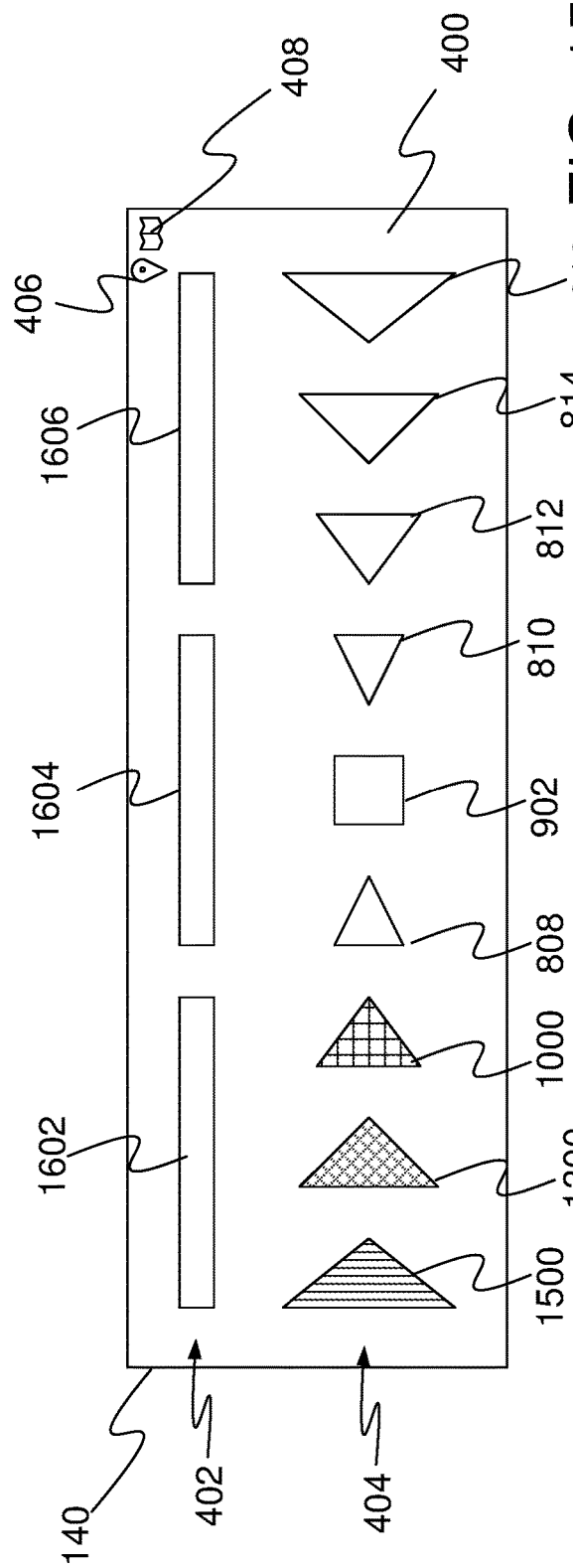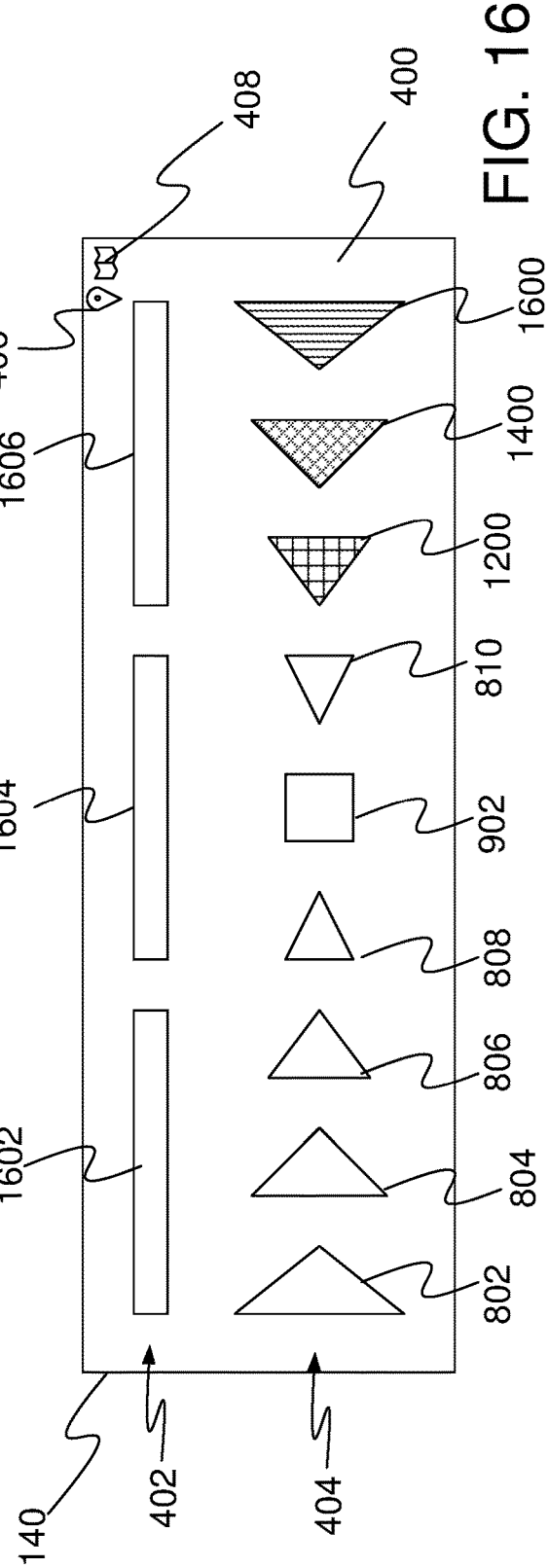

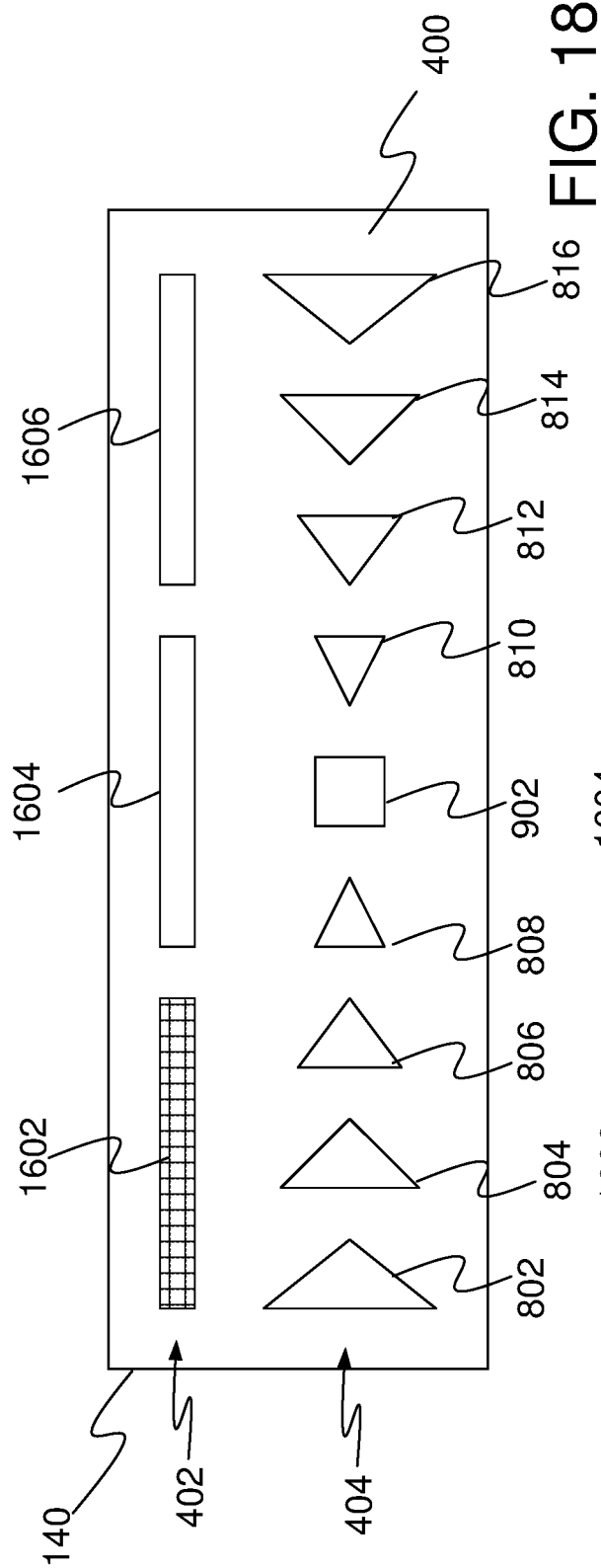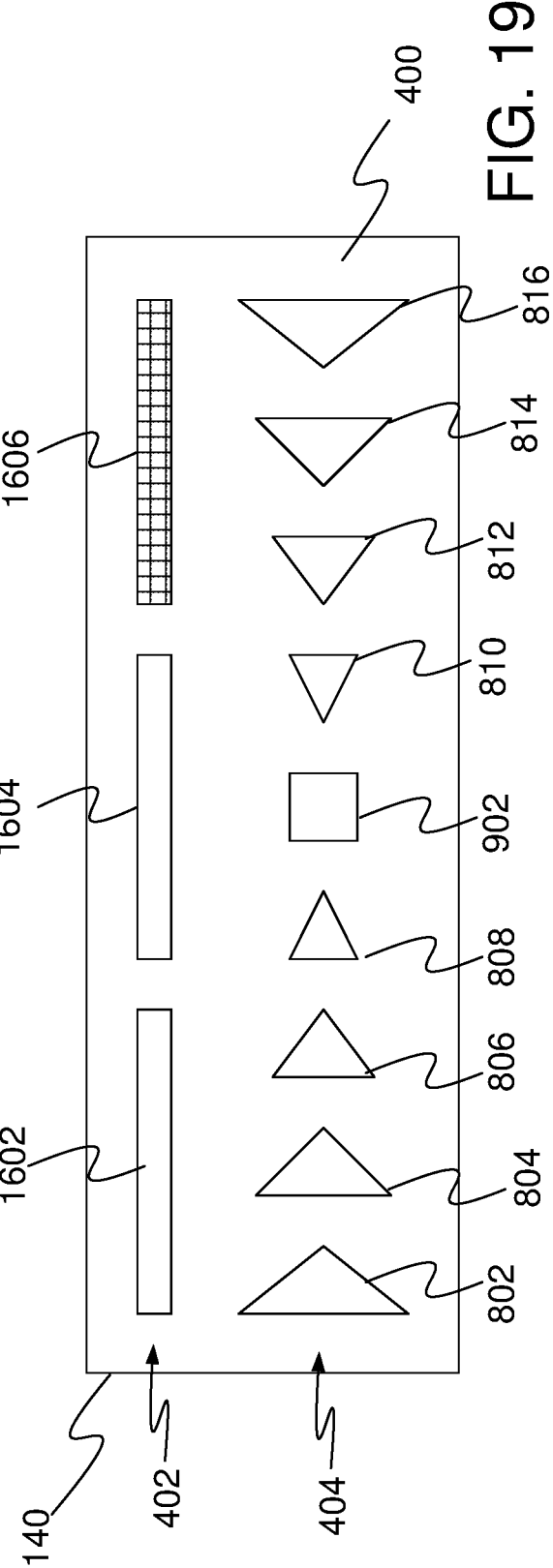

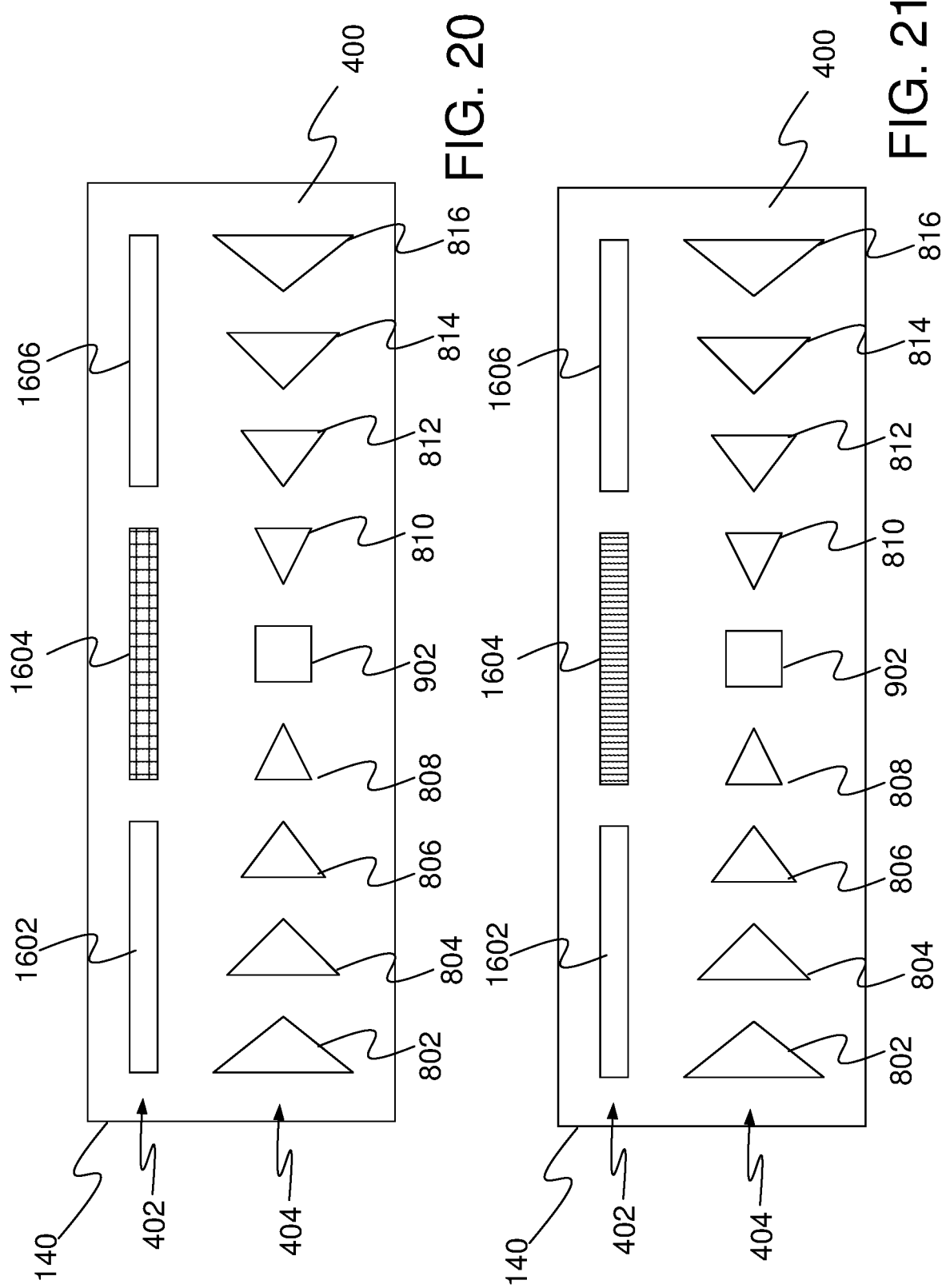

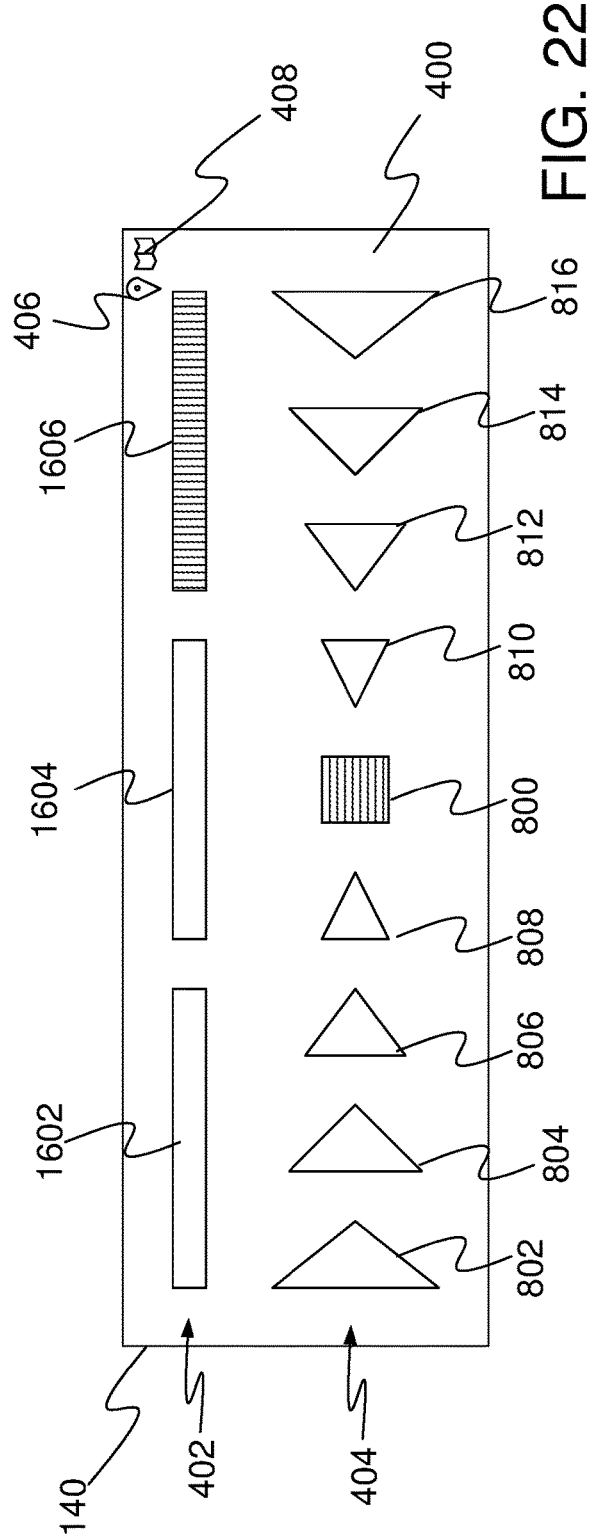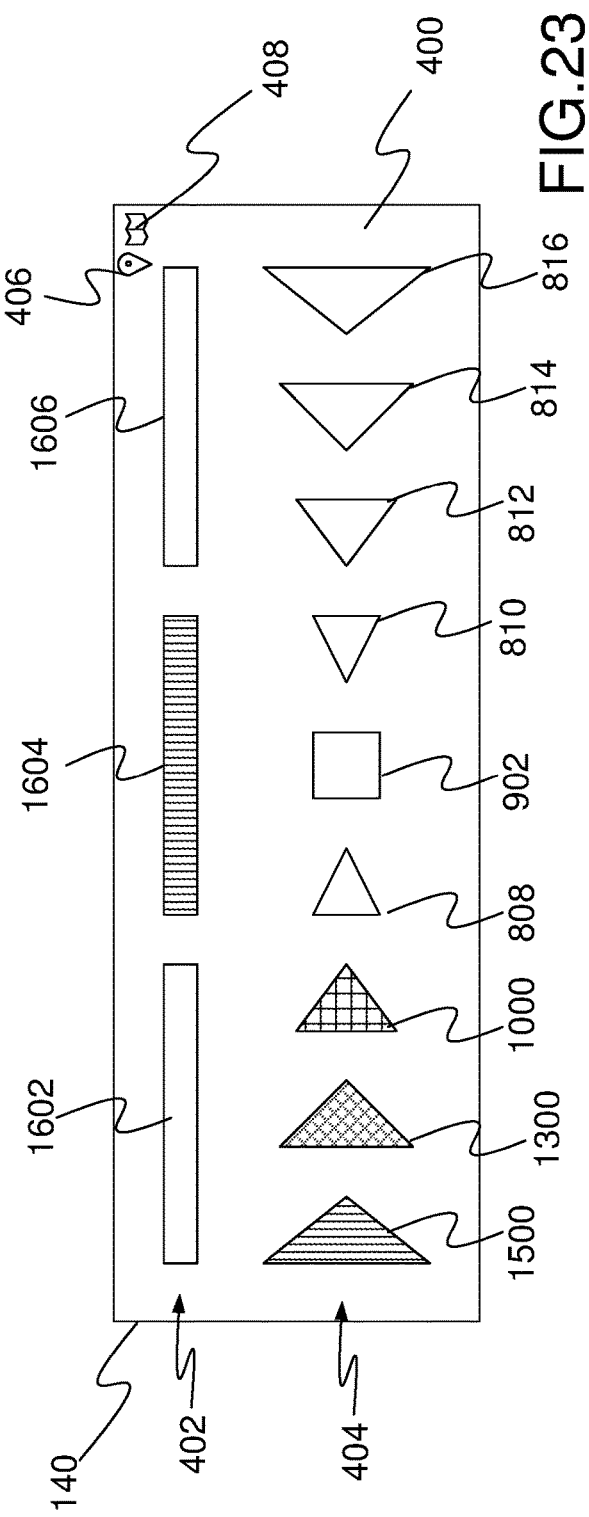

SNOWPLOW DRIVER ASSIST SYSTEM

CROSS-REFERENCE TO RELATED APPLICATION

The present application is based on and claims the benefit of U.S. provisional patent application Ser. No. 63/343,208, filed May 18, 2022, the content of which is hereby incorporated by reference in its entirety.

This invention was made with State of Minnesota support under MnDot 1034033a04 awarded by Minnesota. The State of Minnesota has certain rights in this invention.

BACKGROUND

To remove snow from a road, a snowplow truck is driven along a lane of the road so that a blade attached to the truck pushes snow to the side of the road. Ideally, at least the full width of the lane, from centerline to outer line, is cleared of snow with each pass of the snowplow. In order to achieve this, the snowplow driver must keep the truck correctly positioned within the lane while driving along the road.

The discussion above is merely provided for general background information and is not intended to be used as an aid in determining the scope of the claimed subject matter. The claimed subject matter is not limited to implementations that solve any or all disadvantages noted in the background.

SUMMARY

A system includes a display and a processor coupled to the display. The processor determines a position of a vehicle relative to a road lane and causes the display to depict a set of position indicators to convey the position of the vehicle relative to the road lane. The set of position indicators include a plurality of empty shape outlines and at least one filled shape outline.

In accordance with a further embodiment, a method includes determining a position of a vehicle relative to a desired position and displaying on a display in a cab of the vehicle: a set of icons aligned in a row; and at least one position marking positioned relative to the set of icons to indicate position of the vehicle relative to the desired position.

In accordance with a still further embodiment, a hazard alert system includes a display and a processor coupled to the display. The processor determines a position of a hazard relative to a vehicle and causes the display to depict a set of position indicators to convey the position of the hazard relative to the vehicle, the set of position indicators including a plurality of empty shape outlines and at least one filled shape outline.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 9 is an example user interface that is provided when the vehicle is between one foot and two feet to the left of the desired position.

FIG. 10 is an example user interface that is provided when the vehicle is between one foot and two feet to the right of the desired position.

FIG. 11 is an example user interface that is provided when the vehicle is between two feet and three feet to the left of the desired position.

FIG. 12 is an example user interface that is provided when the vehicle is between two feet and three feet to the right of the desired position.

FIG. 13 is an example user interface that is provided when the vehicle is between three feet and four feet to the left of the desired position.

FIG. 14 is an example user interface that is provided when the vehicle is between three feet and four feet to the right of the desired position.

FIG. 15 is an example user interface that is provided when the vehicle is four feet to the left of the desired position.

FIG. 16 is an example user interface that is provided when the vehicle is four feet to the right of the desired position.

FIG. 18 is an example of a user interface that is provided when the hazard is a first temporal distance from the vehicle and is in the lane to the left of the vehicle.

FIG. 19 is an example of a user interface that is provided when the hazard is the first temporal distance from the vehicle and is in the lane to the right of the vehicle.

FIG. 20 is an example of a user interface that is provided when the hazard is the first temporal distance from the vehicle and is in the lane in front of the vehicle.

FIG. 21 is an example of a user interface that is provided when the hazard is a second temporal distance from the vehicle and is in the lane in front of the vehicle.

FIG. 22 is an example user interface showing icons to depict the location and temporal proximity of a hazard and to indicate the position of the vehicle relative to a desired position.

FIG. 23 is another example user interface showing icons to depict the location and temporal proximity of a hazard and to indicate the position of the vehicle relative to a desired position.

DETAILED DESCRIPTION

Figure 1:
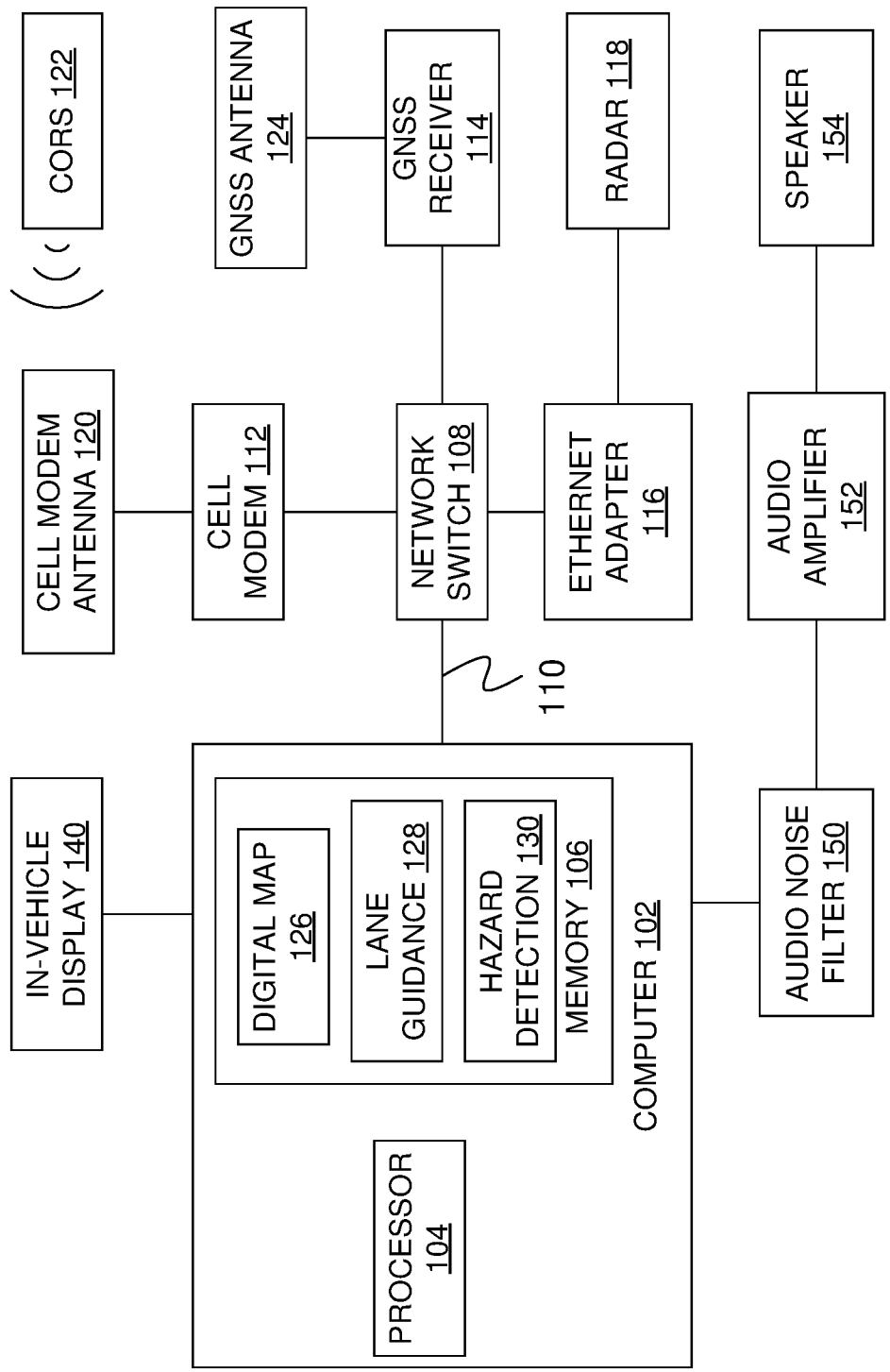
FIG. 1 is a block diagram of a vehicle position assist system in accordance with one embodiment.

Snowplow operators are often tasked with numerous monitoring and operational activities that they need to do simultaneously while removing snow and spreading salt and sand on the roads. Often, falling and blowing snow, as well as snow coming off the snowplow's blade, obscure the driver's view of the road making it difficult for the driver to determine their position in the lane. Such conditions also make it difficult for the driver to see hazards that may be in the road such as parked or stalled vehicles.

The present embodiments provide a vehicle position assist system and hazard detection system that provide snowplow drivers with information about the snowplow's lateral location within a road and hazards that are ahead of the snowplow. The embodiments address several problems that have been present in such systems in the past.

First, a significant amount of snowplowing takes place at night. Because light sources in the cab reflect off the windshield, they can obscure the driver's view of the road at night. As such, displays within the cab that generate a large amount of light are undesirable.

Second, the driver's primary focus is driving the snowplow. This involves staying aware of other moving vehicles in the vicinity of the snowplow by looking out the windshield and using the snowplows mirrors; keeping the snowplow in the proper position on the road; and looking for cross-streets and exits that the plow must follow to execute the snowplows designated route. Any display that requires a significant amount of the driver's attention interferes with the driver's primary focus and can become dangerous if it takes too much of the driver's attention.

To address these issues, the embodiments described below provide a simple user interface that indicates two rows of icons. One row indicates the lateral position of the snowplow using a combination of filled and unfilled shape outlines. The outlines of the shapes remain constant so that the driver is able to quickly determine which shapes are filled at any one time. In addition, the number of outlines that are filled, the shapes of the outlines that are filled and the colors of the filled outlines change based on the distance that the snowplow is offset from the center of the lane. As a result, the driver is provided with several different indicators—position of filled outlines, shape of filled outlines, color of filled outlines and number of filled outlines—to convey the location of the vehicle. Using multiple indicators makes it easier for the driver to quickly determine the location of the snowplow.

The second row of icons indicates the position of any hazards that the snowplow is approaching. When no hazards are present, the second row of icons shows three unfilled shape outlines. When a hazard is detected, one of the outlines is filled with a color while the remaining outlines remain unfilled. The position of the filled outline indicates the lateral position of the hazard: left side of the snowplow, center of the snowplow, or right side of the snowplow. The color of the filled outline indicates the amount of time until the hazard will be reached. In accordance with one embodiment, the color of the filled outline flashes as the snowplow gets closer to the hazard and an alarm sounds.

FIG. 1 provides a block diagram of a system 100 in accordance with one embodiment. System 100 includes a computer 102 having a processor 104 and a memory 106. Computer 102 may be a standard computer or a printed circuit board with components representing processor 104 and memory 106 embedded thereon. Computer 102 is connected to a network switch 108 via an ethernet connection 110. Network switch 108 is also connected to a cellular network modem 112, a Global Navigation Satellite System (GNSS) receiver 114 and an ethernet adapter 116 that is connected to a Radar 118. Cellular modem 112 is connected to a cellular modem antenna 120 and receives corrections for Global Navigation Satellite System positions from a Continuously Operating Reference Station (CORS) network 122. These corrections are provided through network switch 108 in real time to GNSS receiver 114, which uses the corrections and satellite signals received through a GNSS antenna 124 to provide continuous longitude and latitude values (position values) for the position of the center of the snowplow that are accurate to less than four centimeters as well as vehicle speed and course-made-good/course-overground. The corrected position values, speed, and course-made-good/course-over-ground provided by GNSS receiver 114 pass through network switch 108 to processor 104 on computer 102.

Radar 118 detects objects along the forward path of the snowplow. For each hazard that it detects, radar 118 provides the distance to the hazard, the speed at which the snowplow is approaching the hazard and the bearing to the hazard. This information is provided through ethernet adapter 116 and network switch 108 to processor 104.

Computer 102 is also connected to an in-vehicle display 140. Processor 104 sends data to in-vehicle display 140 to cause in-vehicle display 140 to display snowplow lane location information and to display hazard information as discussed further below. Computer 102 is also connected to an audio noise filter 150, which in turn is connected to an audio amplifier 152 that drives a speaker 154. By sending signals to audio noise filter 150, processor 104 is able to generate sounds through speaker 154.

Figure 2:
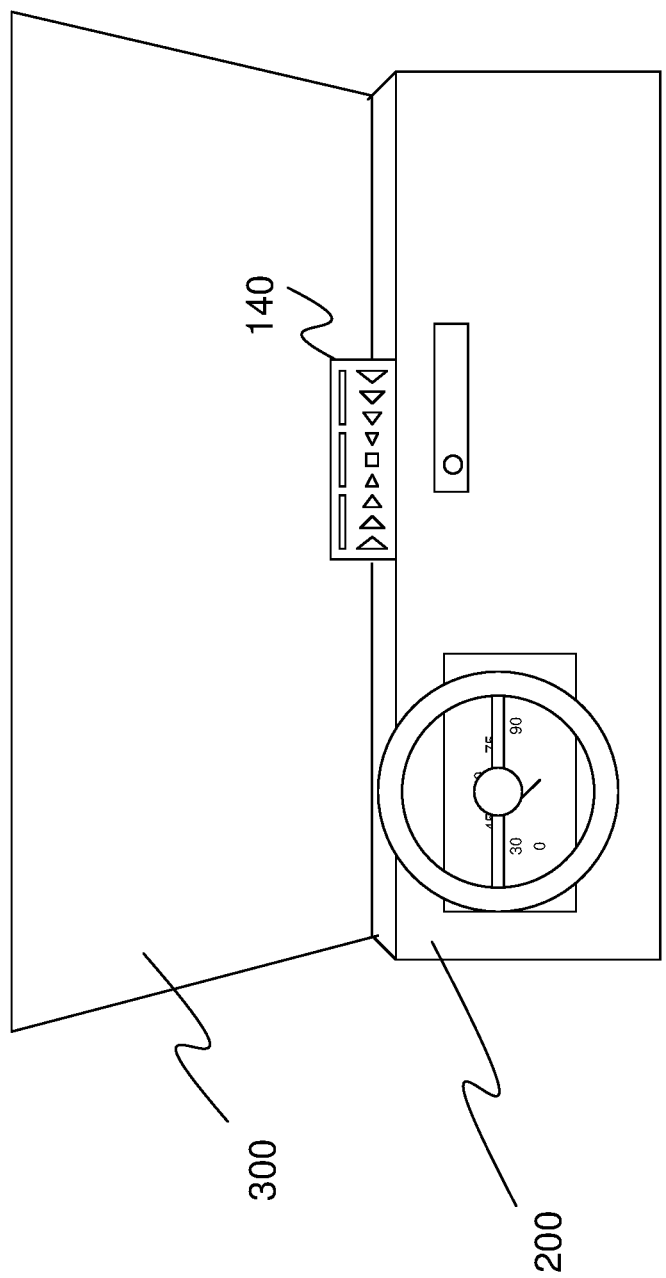
FIG. 2 is a view of an interior of a vehicle cab showing a first position for a display of the various embodiments.
Figure 3:
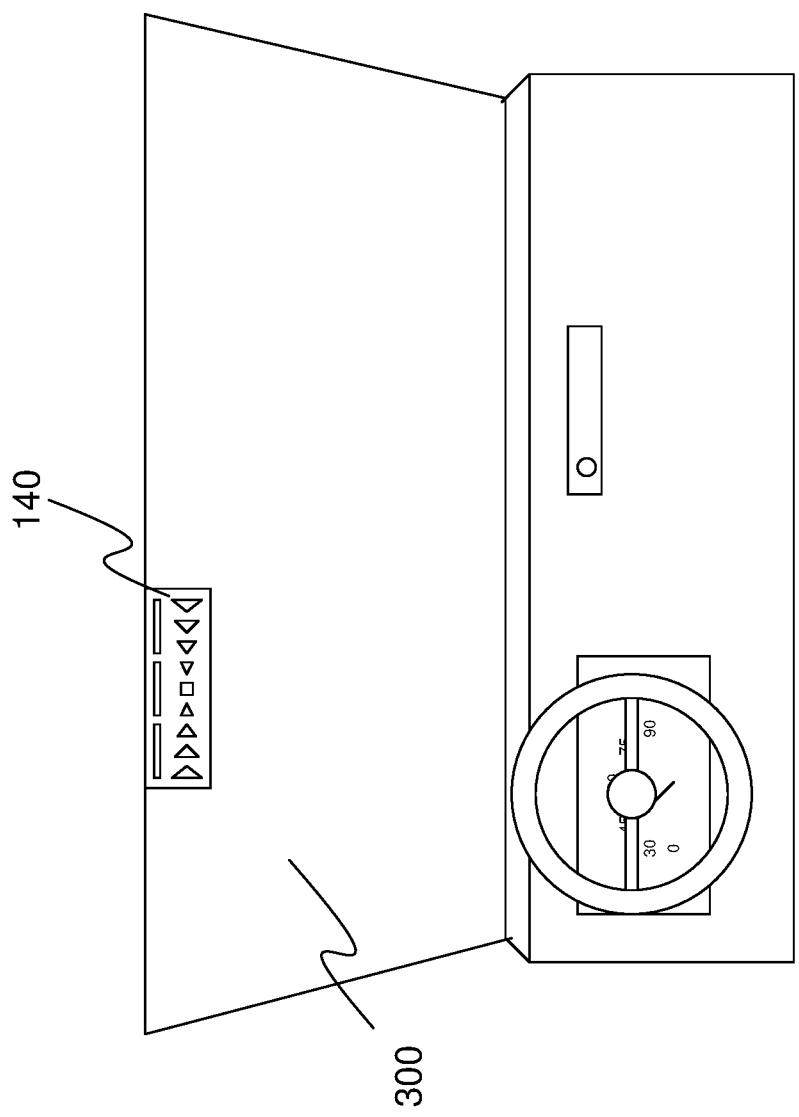
FIG. 3 is a view of an interior of a vehicle cab showing a second position for a display of the various embodiments.

FIG. 2 depicts the inside of a snowplow cab showing a location of display 140 in accordance with one embodiment. As shown in FIG. 2, display 140 is mounted on top of a dashboard 200 in the snow ploy cab. FIG. 3 depicts the inside of the snowplow cab showing an alternative location for display 140. In FIG. 3, display 140 is mounted at the top of a windshield 300. In both the location of FIG. 2 and the location of FIG. 3, the driver is able to see display 140 in the periphery of their vision while looking out the windshield.

Figure 4:
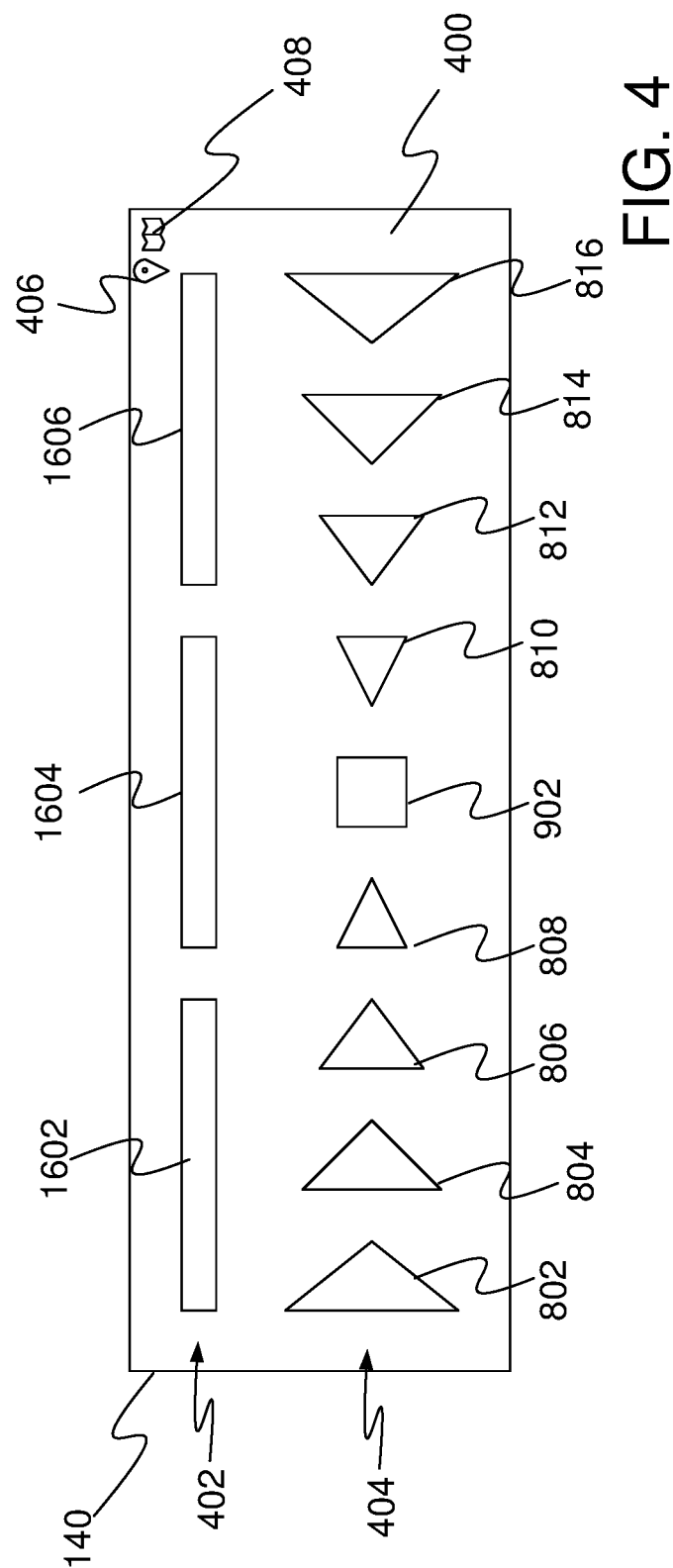
FIG. 4 is an example of a user interface in accordance with one embodiment.

FIG. 4 shows an example of a user interface 400 shown on display 140. User interface 400 includes a row 402 of hazard icons, a row 404 of position icons, a GNSS pin icon 406 and a map icon 408. The hazard icons of row 402 are used to indicate if a hazard is ahead of the snowplow and where the hazard is relative to the snowplow. The position icons of row 404 are used to indicate the lateral position of the snowplow within a lane. GNSS pin icon 406 is shown as one color when corrected GNSS values are being provided by GNSS receiver 114 and is shown as another color when corrected GNSS values are not being provided. Map icon 408 is shown as one color when a map is available for the road that the snowplow is on and is shown as another color when the system does not have access to a map for the road.

Figure 5:
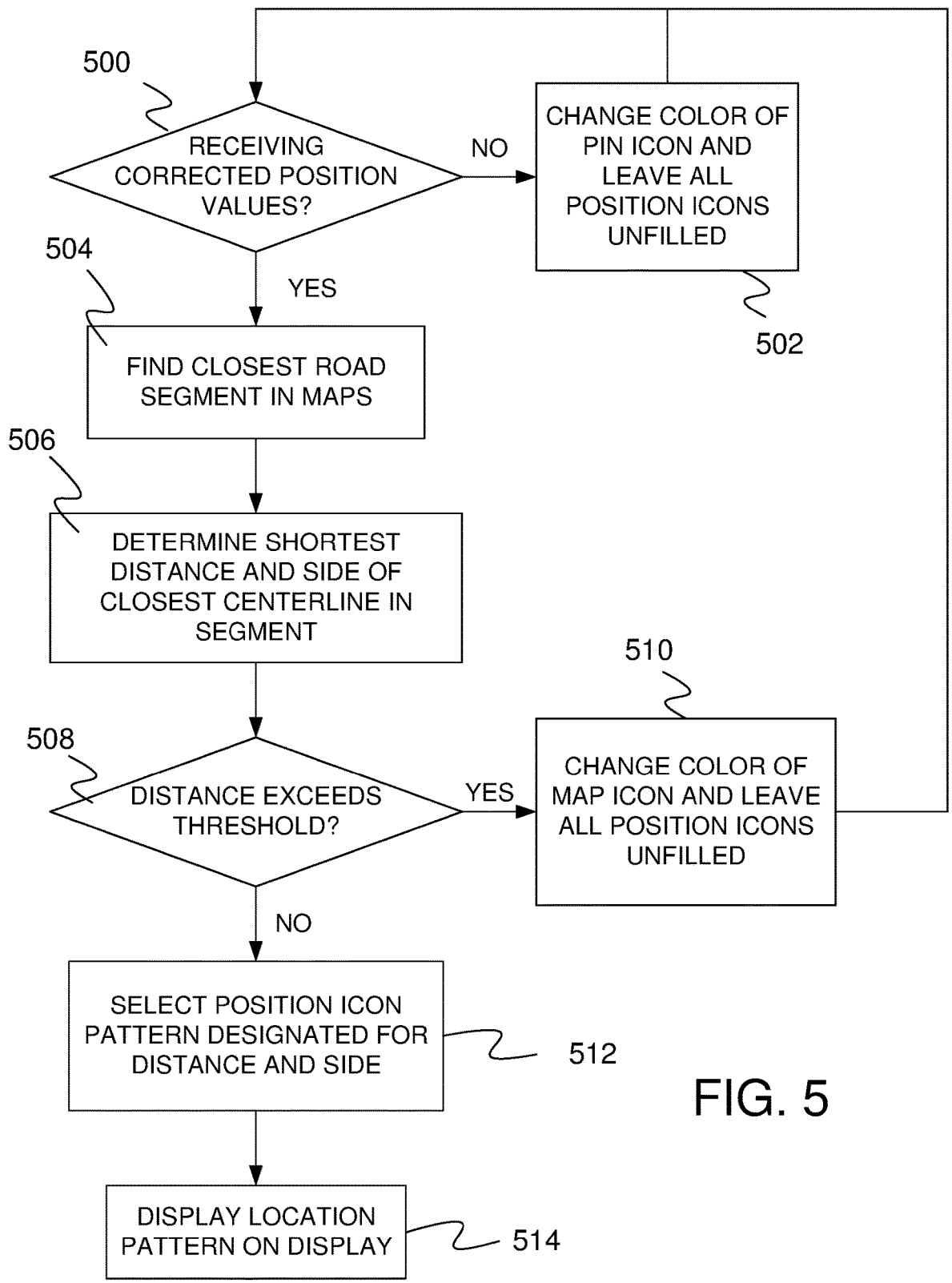
FIG. 5 is a flow diagram of a method for selecting and displaying patterns on a user interface based on a position of a vehicle relative to a desired position.

A lane guidance application 128 stored in memory 106 and executed by processor 104 includes instructions for a method of displaying the position icons to indicate the position of the snowplow in the lane. FIG. 5 is a flow diagram of that method.

In step 500, processor 104 determines if corrected position values are being received from GNSS receiver 114. At times, the system will lose contact with one or both of the cellular network or the satellites and as a result, GNSS receiver 114 will not be able to provide corrected position values. When this occurs, processor 104 modifies the user interface to change the color of GNSS pin icon 406 and displays all of the vehicle position icons of row 404 as empty shape outlines at step 502.

Figure 6:
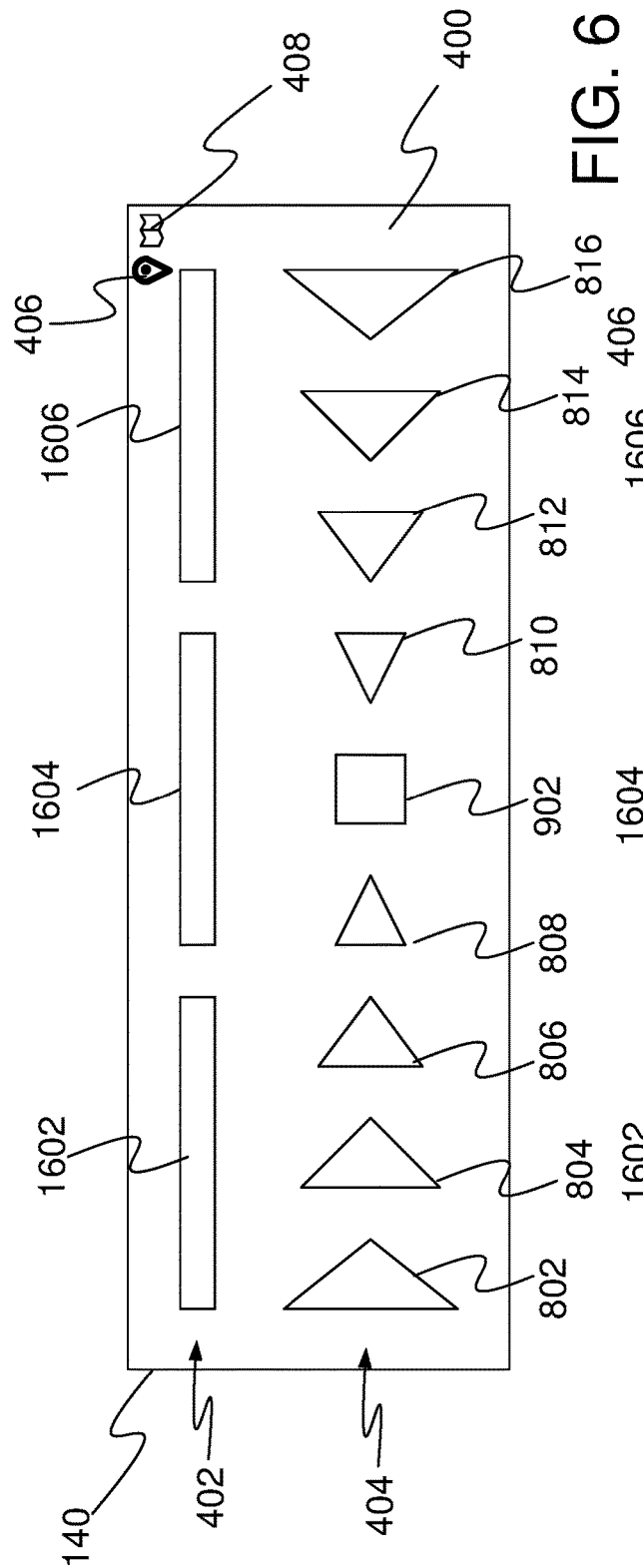
FIG. 6 is an example user interface presented when the GNSS system is unable to provide corrected positions.

FIG. 6 provides an example of the appearance of user interface 400 when corrected position values are not being received and there are no hazards in front of the vehicle. As shown in FIG. 6, each of the nine position icons (802, 804, 806, 808, 902, 810, 812, 814, and 816) in row 404 are empty shape outlines. By showing all of the potion icons as being empty, the system quickly conveys to the driver that the position detection system is not working. In addition, the color of GNSS pin icon 406 has been changed (as indicated by thicker lines in the drawing). By changing the color of GNSS pin icon 406, the system conveys that the reason the position detection system is not working is because corrected positions are not being received for the vehicle.

After step 502, processor 104 returns to step 500 to once again determine if corrected position values are being provided. When corrected position values are provided at step 500, processor 104 searches maps 126 in memory 106 for a road segment and lane that are closest to the latitude and longitude of the vehicle at step 504. In accordance with one embodiment, maps 126 includes a search structure that can be used to identify a closest road segment and lane for any given longitude and latitude. Maps 126 also includes position information for the centerline of each lane in each road segment. This position information is used in step 506 to determine the shortest distance from the position of the vehicle to the centerline of the closest lane.

At step 508, processor 104 determines if the distance calculated in step 506 exceeds a threshold distance. When the distance exceeds the threshold, processor 104 assumes that vehicle is not on the road segment and alters user interface 140 to change the color of map icon 408 and to display all of the position icons of row 404 as empty shape outlines at step 510.

Figure 7:
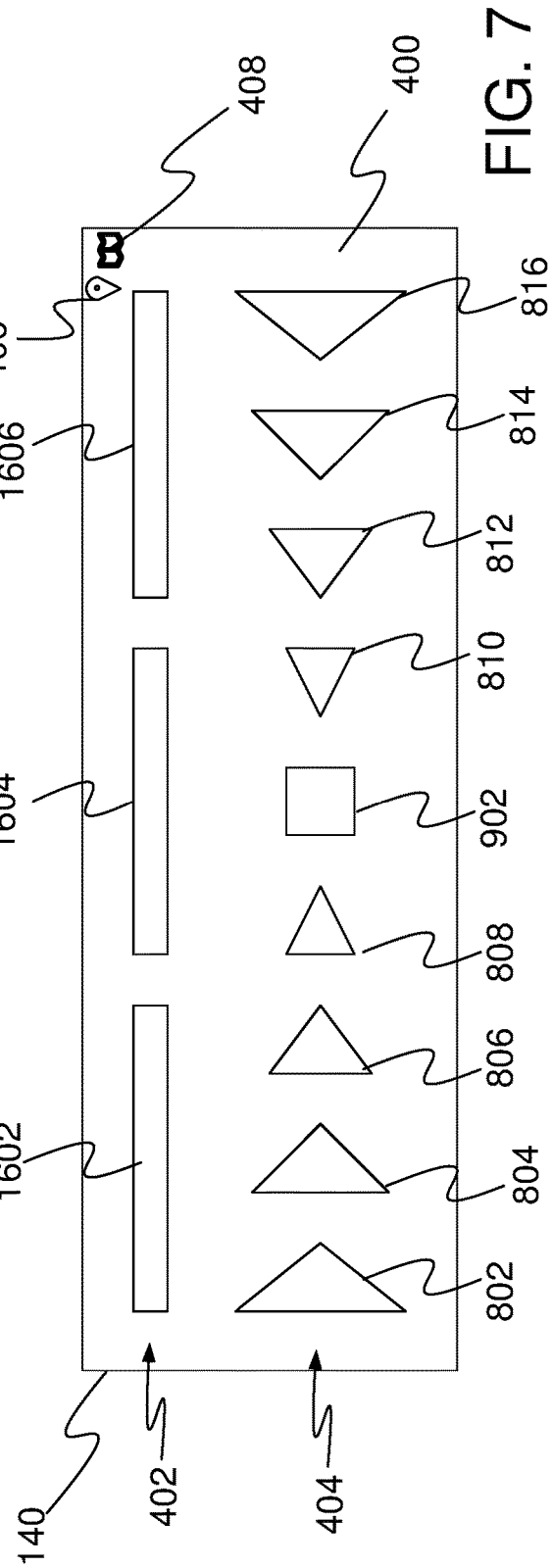
FIG. 7 is an example user interface presented when the road that the vehicle is on is not mapped.

FIG. 7 provides an example of the appearance of user interface 400 when the road that the vehicle is on is not in maps 126 and there are no hazards in front of the vehicle. As shown in FIG. 7, each of the nine position icons (802, 804, 806, 808, 902, 810, 812, 814, and 816) in row 404 are empty shape outlines. By showing all of the position icons as being empty, the system quickly conveys to the driver that the position detection system is not working. By removing map pin icon 408, the system conveys that the reason the position detection system is not working is because the road that the vehicle is on is not in the stored maps of the system.

After the user interface has been altered at step 510, the process of FIG. 5 returns to step 500.

When the distance between the snowplow and the closest lane centerline does not exceed the threshold at step 508, processor 104 selects a pattern of filled and unfilled position icons that is to be displayed on user interface 400 to convey the location of the snowplow at step 512. In accordance with one embodiment, to perform step 512, lane guidance application 128 first determines what side of the centerline the snowplow is on and which of a set of distance ranges the distance falls within. A pattern of filled and unfilled position icons associated with the determined side and distance range is then selected.

After the pattern has been selected, user interface 400 is altered to show the selected pattern of filled and unfilled position icons at step 514. The process then continues by returning to step 500.

FIGS. 8-16 show examples of user interface 400 showing various patterns of filled and unfilled position icons to indicate respective positions for the snowplow relative to a desired position for the snowplow. In accordance with one embodiment, the desired position for the snowplow is to have the center of the snowplow aligned with the lane centerline.

Figure 8:
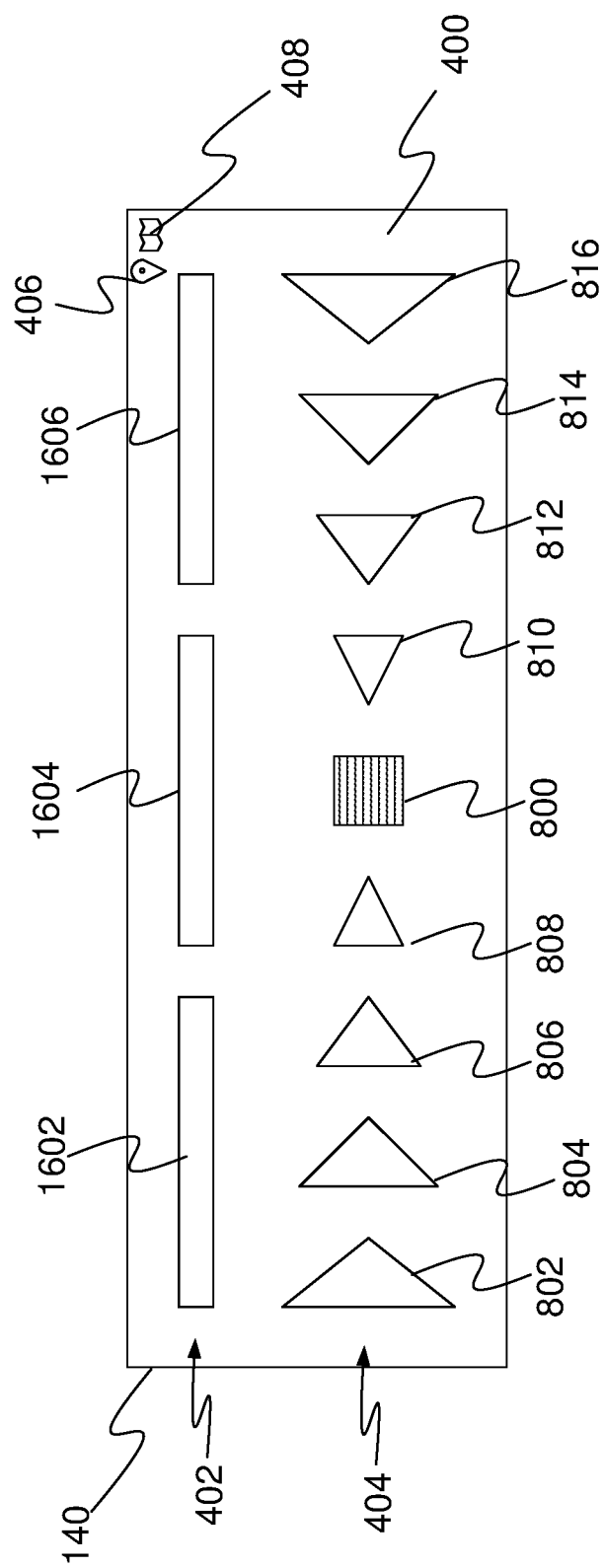
FIG. 8 is an example user interface that is provided when the vehicle is within a foot of its desired position.

In FIG. 8, user interface 400 shows a pattern of position icons that is displayed when the snowplow is within one foot of the centerline, either to the left or to the right of the centerline. In FIG. 8 a square position icon 800 is shown filled with a green color and there are four unfilled triangular position icons, on both the left side (802, 804, 806 and 808) and the right side (810, 812, 814 and 816) of position icon 800. In other words, there are an equal number of empty shape outlines to the left and to the right of position icon 800.

In FIG. 8, position icon 800 acts as a position marking that provides a number of different indications of the position of the snowplow relative to the desired position for the snowplow. First, the green color of position icon 800 is only used when the snowplow is within a foot of the desired position. As such, when the driver detects that user interface 400 contains a green-filled icon, the driver knows that the snowplow is within a foot of the desired position. Note that the driver does not need to determine the position of position icon 800 on user interface 400 or the shape of the icon, but simply needs to determine that the icon is green. Second, position icon 800 is the only square icon on user interface 400. When the driver determines that there is a filled square on user interface 400, the driver knows that the snowplow is within a foot of the desired position. Note that the driver does not need to determine the position of position icon 800 on user interface 400 and does not need to determine what color the square is to determine that the icon is square. Third, the position of filled position icon 800 relative to the unfilled shapes in row 404 indicates that the snowplow is within a foot of the desired position for the snowplow. Specifically, the fact that filled position icon 800 is positioned in row 404 such that there is an equal number of empty shape outlines on both sides filled position icon 800 indicates that the snowplow is within a foot of the desired position for the snowplow. By providing three independent indications that the snowplow is within a foot of a desired position, position icon 800 makes it easier for the driver to determine that snowplow is properly positioned.

FIGS. 9 and 10 show patterns of position icons that are displayed on user interface 400 when the snowplow is between one foot and two feet of the centerline. FIG. 9 shows the pattern displayed when the snowplow is to the left of the centerline and FIG. 10 shows the pattern when the snowplow is to the right of the centerline. In FIG. 9 a triangle position icon 900 is shown filled with a yellow color and there are three unfilled position icons/empty shape outlines on the left side (802, 804, and 806) and five unfilled position icons/empty shape outlines on the right side (902, 810, 812, 814 and 816) of position icon 900. In FIG. 10 a triangle position icon 1000 is shown filled with a yellow color and there are three unfilled position icons/empty shape outlines on the right side (812, 814 and 816) and five unfilled position icons/empty shape outlines on the left side (802, 804, 806, 808, and 902) of position icon 1000.

In FIGS. 9 and 10, position icons 900 and 1000 act as position markings that provide a number of different indications of the position of the snowplow relative to the desired position for the snowplow. First, the yellow color of position icons 900 and 1000 is only used when the snowplow is between one and two feet from the desired position. As such, when the driver detects that user interface 400 contains a yellow-filled icon, the driver knows that the snowplow is between one and two feet of the desired position. Second, position icon 900 is the only triangle icon to the immediate left of a square icon on user interface 400 and position icon 1000 is the only triangle icon to the immediate right of a square icon on user interface 400. When the driver determines that there is a filled triangle to the immediate left of an empty square on user interface 400, the driver knows that the snowplow is between one foot and two feet to the left of the desired position. When the driver determines that there is a filled triangle to the immediate right of an empty square on user interface 400, the driver knows that the snowplow is between one foot and two feet to the right of the desired position. Third, the positions of filled position icons 900 and 1000 relative to the unfilled shapes in row 404 indicates the position of the snowplow. Specifically, the fact that filled position icon 900 is positioned in row 404 such that there are three empty shape outlines to the left of filled position icon 900 and five empty shape outlines to the right of filled position icon 900 indicates that the snowplow is between one foot and two feet to the left of the desired position. Similarly, the fact that filled position icon 1000 is positioned in row 404 such that there are five empty shape outlines to the left of filled position icon 1000 and three empty shape outlines to the right of filled position icon 1000 indicates that the snowplow is between one foot and two feet to the right of the desired position.

FIGS. 11 and 12 show patterns of position icons that are displayed on user interface 400 when the snowplow is between two feet and three feet of the desired position. FIG. 11 shows the pattern displayed when the snowplow is to the left of the desired position and FIG. 12 shows the pattern when the snowplow is to the right of the desired position. In FIG. 11, a triangle position icon 1100 is shown filled with an orange color and there are two unfilled position icons/empty shape outlines on the left side (802 and 804) and six unfilled position icons/empty shape outlines on the right side (808, 902, 810, 812, 814 and 816) of position icon 1100. In FIG. 12, a triangle position icon 1200 is shown filled with an orange color and there are two unfilled position icons/empty shape outlines on the right side (812, 814, and 816) and six unfilled position icons/empty shape outlines on the left side (802, 804, 806, 808, 902, and 810) of position icon 1200.

In FIGS. 11 and 12, position icons 1100 and 1200 act as position markings that provide a number of different indications of the position of the snowplow relative to the desired position for the snowplow. First, the orange color of position icons 1100 and 1200 is only used when the snowplow is between two and three feet from the desired position. As such, when the driver detects that user interface 400 contains an orange-filled icon, the driver knows that the snowplow is between two and three feet from the desired position. Second, the positions of filled position icons 1100 and 1200 relative to the unfilled shapes in row 404 indicates the position of the snowplow. Specifically, the fact that filled position icon 1100 is positioned in row 404 such that there are two empty shape outlines to the left of filled position icon 1100 and six empty shape outlines to the right of filled position icon 1100 indicates that the snowplow is between two and three feet to the left of the desired position. Similarly, the fact that filled position icon 1200 is positioned in row 404 such that there are six empty shape outlines to the left of filled position icon 1200 and two empty shape outlines to the right of filled position icon 1200 indicates that the snowplow is between two and three feet to the right of the desired position.

FIGS. 13 and 14 show patterns of position icons that are displayed on user interface 400 when the snowplow is between three feet and four feet of the desired position. FIG. 13 shows the pattern displayed when the snowplow is to the left of the desired position and FIG. 14 shows the pattern when the snowplow is to the right of the desired position. In FIG. 13, triangle position icon 1100 is shown filled with an orange color and a triangle position icon 1300 is shown to the left of position icon 1100 and is filled with a red-orange color. An unfilled position icon/empty shape outline 802 is shown to the left of filled position icon 1300 and six unfilled position icons/empty shape outlines on the right side (808, 902, 810, 812, 814 and 816) of position icon 1100. In FIG. 14, triangle position icon 1200 is shown filled with an orange color and a triangle position icon 1400 is shown to the right of position icon 1200 and is filled with a red-orange color. An unfilled position icon/empty shape outline 816 is shown to the right of filled position icon 1400 and six unfilled position icons/empty shape outlines on the left side (802, 804, 806, 808, 902, and 810) of position icon 1200.

The combination of position icons 1100 and 1300 in FIG. 13 and the combination of position icons 1200 and 1400 in FIG. 14 act as position markings that provide a number of different indications of the position of the snowplow relative to the desired position for the snowplow. First, the only time two filled position icons are shown on user interface 400 is when the snowplow is between three and four feet from the desired position. As such, when the driver detects that user interface 400 contains two filled position icons, the driver knows that the snowplow is between three and four feet from the desired position. Second, the positions of filled position icons 1100 and 1300 in FIG. 13 and the positions of filled position icons 1200 and 1400 in FIG. 14 indicate the position of the snowplow. Specifically, the fact that filled position icons 1100 and 1300 are positioned in row 404 such that there is one empty shape outline to the left of filled position icon 1300 and six empty shape outlines to the right of filled position icon 1100 indicates that the snowplow is between three and four feet to the left of the desired position. Similarly, the fact that filled position icons 1200 and 1400 are positioned in row 404 such that there are six empty shape outlines to the left of filled position icon 1200 and one empty shape outline to the right of filled position icon 1400 indicates that the snowplow is between three and four feet to the right of the desired position.

FIGS. 15 and 16 show patterns of position icons that are displayed on user interface 400 when the snowplow is between four feet from the desired position. FIG. 15 shows the pattern displayed when the snowplow is to the left of the desired position and FIG. 16 shows the pattern when the snowplow is to the right of the desired position. In FIG. 15, triangle position icon 1100 is shown filled with an orange color, triangle position icon 1300 is shown to the left of position icon 1100 and is filled with a red-orange color, and a triangle position icon 1500 filled with a red color is shown to the left of triangle position icon 1300. Six unfilled position icons/empty shape outlines on the right side (808, 902, 810, 812, 814 and 816) of position icon 1100. In FIG. 14, triangle position icon 1200 is shown filled with an orange color, triangle position icon 1400 is shown to the right of position icon 1200 and is filled with a red-orange color, and a triangle position icon 1600 is shown to the right of triangle position icon 1400 and is filled with a red color. Six unfilled position icons/empty shape outlines on the left side (802, 804, 806, 808, 902, and 810) of position icon 1200.

The combination of position icons 1100, 1300 and 1500 in FIG. 15 and the combination of position icons 1200, 1400 and 1600 in FIG. 16 act as position markings that provide a number of different indications of the position of the snowplow relative to the desired position for the snowplow. First, the only time three filled position icons are shown on user interface 400 is when the snowplow is four feet from the desired position. As such, when the driver detects that user interface 400 contains three filled position icons, the driver knows that the snowplow is four feet from the desired position. Second, the positions of filled position icons 1100, 1300 and 1500 in FIG. 15 and the positions of filled position icons 1200, 1400 and 1600 in FIG. 16 indicate the position of the snowplow. Specifically, the fact that filled position icons 1100, 1300 and 1500 are positioned in row 404 such that there are no empty shape outlines to the left of filled position icon 1500 and six empty shape outlines to the right of filled position icon 1100 indicates that the snowplow is four feet to the left of the desired position. Similarly, the fact that filled position icons 1200, 1400, and 1600 are positioned in row 404 such that there are six empty shape outlines to the left of filled position icon 1200 and no empty shape outlines to the right of filled position icon 1600 indicates that the snowplow is four feet to the right of the desired position.

When the snowplow is more than four feet to the right or left of the desired position, the filled position icons in FIGS. 15 and 16 flash. Thus, filled position icons 1100, 1300 and 1500 of FIG. 15 flash when the snowplow is more than four feet to the left of the desired position and filled position icons 1200, 1400 and 1600 flash when the snowplow is more than four feet to the right of the desired position.

Figure 17:
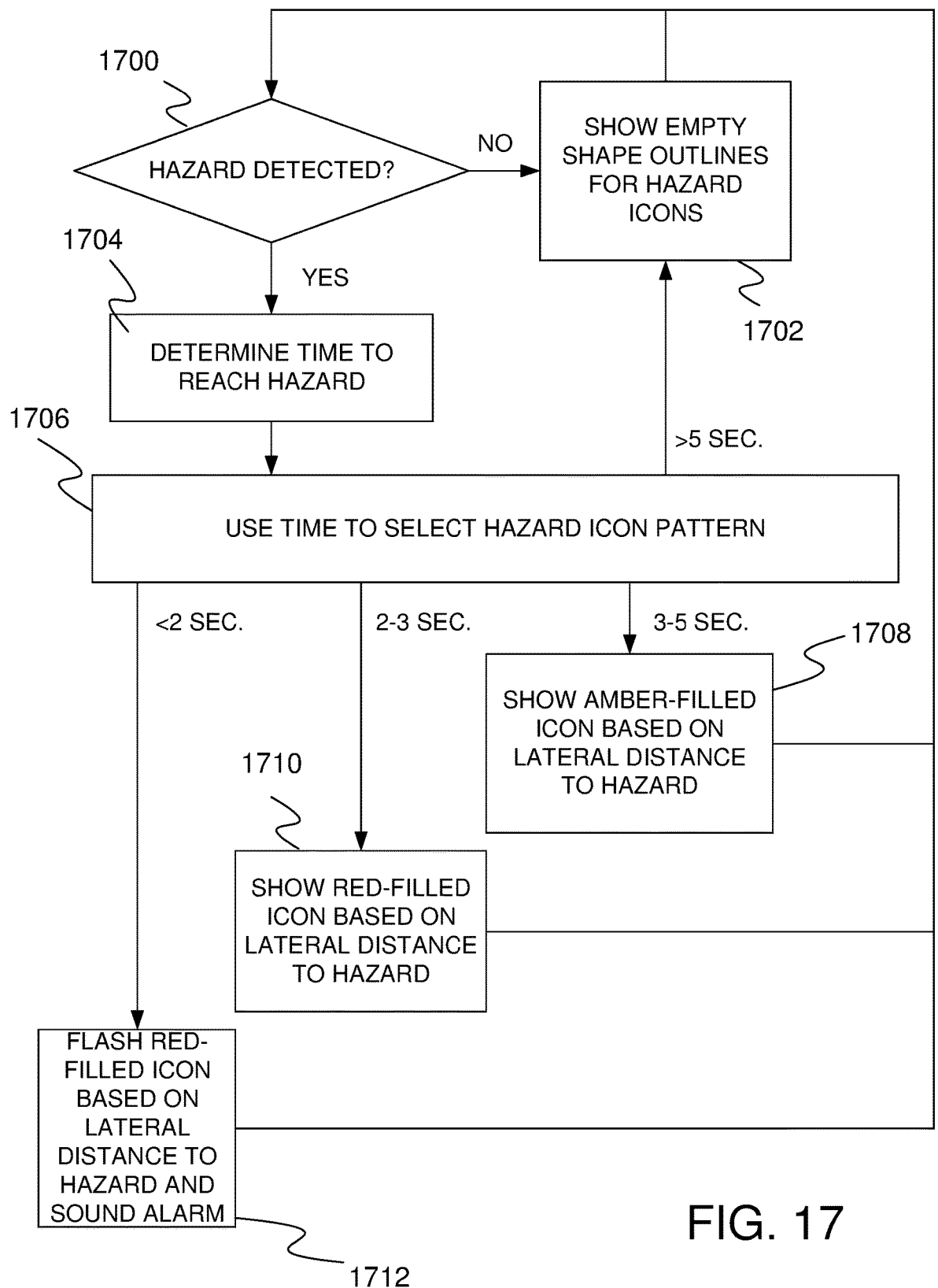
FIG. 17 is a flow diagram of a method of selecting a pattern for a user interface to indicate the location and temporal proximity of a hazard.

As noted above, user interface 400 also includes a row 402 of hazard icons. The appearance of the hazard icons is determined by a hazard detection module 130 stored in memory 106 and executed by processor 104 in FIG. 1. FIG. 17 provides a flow diagram of a method performed by hazard detection module 130 to set the appearance of the hazard icons.

In step 1700, hazard detection module 130 determines if a hazard has been detected by radar 118. In accordance with one embodiment, radar 118 generates a message for each hazard that it detects. This message includes the range (distance) between the snowplow and the object and the bearing (angle) between a line extending directly in front of the snowplow and the the object.

When no hazard is detected at step 1700, hazard detection module 130 causes three empty shape outlines to be shown as the hazard icons. For example, in FIG. 16, no hazards are detected and empty shape outlines 1602, 1604, and 1606 are generated for user interface 400 at step 1702. The process then returns to step 1700 to once again determine if any hazards have been detected.

When radar 118 detects a hazard, hazard detection module 130 determines a time to reach the hazard at step 1704. In accordance with one embodiment, hazard detection module 130 makes this determination by using two detection messages from radar 118 at two different points in time. For each message, hazard detection module 130 uses the range and bearing of the hazard to determine a forward distance and lateral distance at each time point. Each forward distance is determined along a line of travel of the snowplow and is the distance between the front of the snowplow and a line that intersects the hazard and is perpendicular to the line of travel. Each lateral distance is measured along a line perpendicular to the line of travel and is the distance between the center of the snowplow and the hazard.

The two forward direction distances (D1, D2) and the time span between the points in time (T1, T2) are then used to determine a forward velocity of the snowplow relative to the hazard (V=D1−D2/T2−T1). Hazard detection module 130 then uses the calculated forward velocity and the latest forward distance to determine how long it will take the snowplow to strike or pass the hazard (T=D2/V).

At step 1706, hazard detection module 130 uses the calculated time to strike/pass the hazard to select a pattern of hazard icons to display on user interface 400.

In accordance with one embodiment, if the time exceeds a maximum amount of time at step 1706, such as five seconds, hazard detection module 130 shows three empty shape outlines as the hazard icons at step 1702. Thus, even though radar 118 has detected a hazard, the hazard is far enough away that hazard detection module 130 does not alert the driver. This reduces the number of alerts the driver receives and allows the driver to concentrate more on the road.

When the time is short enough to warrant an alert, such as three to five seconds at step 1706, hazard detection module 130 displays a pattern of hazard icons that includes one shape outline filled with amber and two empty shape outlines at step 1708. In step 1708, the shape outline that is shown as filled is selected based on the latest lateral distance determined for the hazard. If the lateral distance is more than half the width of a lane to the left of the snowplow, left-most shape outline 1602 is filled with amber while center shape outline 1604 and right-most shape outline 1606 are empty as shown in FIG. 18. If the lateral distance is more than half the width of a lane to the right of the snowplow, right-most shape outline 1606 is filled with amber while center shape outline 1604 and left-most shape outline 1602 are empty shape outlines as shown in FIG. 19. Thus, left-most shape outline 1602 indicates when a hazard is in the next lane to the left of the snowplow and right-most shape outline 1606 indicates when a hazard is in the next lane to the right of the snowplow.

When the lateral distance is less than half a lane from the center of the snowplow, center shape outline 1604 is filled with amber and shape outlines 1602 and 1606 are empty as depicted in FIG. 20.

By including the empty shape outlines in FIGS. 18-20, the embodiments make it easier for the driver to determine the location of the hazard. In particular, the position of the filled shape outline relative to the unfilled shape outlines informs the driver of the location of the hazard relative to the snowplow.

When the time to reach the hazard warrants a higher level of alert at step 1706, such as when the time is between two and three seconds, hazard detection module 130 fills the shape outline of the hazard icon with red instead of amber. For example, in FIG. 21, shape outline 1604 is filled with red while shape outline 1602 and 1604 are empty shapes indicating that a hazard is between two and three seconds away and is in the same lane as the snowplow. When the hazard is two to three seconds away and is in the left lane, left-most shape outline 1602 is filled with red and the other two hazard icons are shown as empty shape outlines. When the hazard is two to three seconds away and is in the right lane, right-most shape outline 1606 is filled with red and the other two hazard shape outlines are shown empty.

When a hazard is about to be reached at step 1706, for example when the time to reach the hazard is less than two seconds, one of the hazard shape outlines is filled with red and flashes and an audio alarm is sounded through speaker 154 as shown in step 1712. For example, if the hazard is less than two seconds from the snowplow and is in the same lane as the snowplow, center shape outline 1604 is filled with red and flashes while shape outlines 1602 and 1606 appear as non-flashing empty shape outlines. When a hazard is less than two seconds from the snowplow and is in the lane left of the snowplow, left-most shape outline 1602 is filled with red and flashes while shape outlines 1604 and 1606 appear as non-flashing empty shape outlines. When a hazard is less than two seconds from the snowplow and is in the lane right of the snowplow, right-most shape outline 1606 is filled with red and flashes while shape outlines 1604 and 1606 appear as non-flashing empty shape outlines.

As shown in FIGS. 18-21, hazard detection module 130 is able to indicate the location and time to hazards even when lane guidance module 128 is unable to provide a position of the snowplow relative to a desired position. In each of FIGS. 18-21, none of the position icons are filled and map icon 408 and GNSS pin icon 406 are not displayed. Thus, in these figures lane guidance module is unable to determine the position of the snowplow relative to the desired position. Nonetheless, hazard detection module 130 continues to be able to show the location and time to hazards.

FIGS. 22 and 23 show that lane guidance module 128 and hazard detection module 130 can operate at the same time. In FIG. 22, lane guidance module 128 has set the hazard icons of user interface 400 to indicate that a hazard is in the right lane and is between two and three seconds from the snowplow by showing hazard icon 1606 filled with red and hazard icons 1602 and 1604 as empty shape outlines. At the same time, lane guidance module 128 has set the position icons to indicate that the snowplow is within a foot of the desired position by showing center position icon 800 filled and the other icons 802, 804, 806, 808, 810, 812, 814 and 816 as empty shape outlines. In FIG. 23, lane guidance module 128 has set the hazard icons of user interface 400 to indicate that a hazard is in front of the snowplow and is between two and three seconds from the snowplow by showing hazard icon 1604 filled with red and hazard icons 1602 and 1606 as empty shape outlines. At the same time lane guidance module 128 has set the position icons to indicate that the snowplow is four feet to the left of the desired position of the snowplow by showing filled position icons 1500, 1300 and 1100 and empty shape outlines 808, 902, 810, 812, 814 and 816 to the right of filled icon 1100. Those skilled in the art will recognize that any of the patterns of hazard icons discussed above can be combined with any of the patterns of position icons discussed above to form user interface 400.

As shown in FIGS. 22 and 23, the shapes used for the hazard icons are different from the shapes used for the position icons. This allows the driver to easily distinguish the hazard icons from the position icons. In addition, the hazard icons depict location information at a different scale from the position icons. Specifically, while the position icons depict the position of the vehicle relative to the lane centerline at one-foot intervals, the hazard icons depict the locations of hazards at lane-width intervals.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A system comprising:
    a display; and
    a processor coupled to the display, the processor determining a position of a vehicle relative to a road lane and causing the display to depict a set of position indicators to convey the position of the vehicle relative to the road lane, the set of position indicators comprising a plurality of empty shape outlines and at least one filled shape outline
    wherein when the system is unable to determine the position of the vehicle relative to the road lane because the vehicle position system is unable to determine a longitude and latitude of the vehicle, the processor changes a first icon on the display and when the system is unable to determine the position of the vehicle relative to the road lane because the system is unable to access longitude and latitude information for the road, the processor changes a second icon on the display.

2. The system of claim 1 wherein a position of the at least one filled shape outline relative to the plurality of empty shape outlines indicates the position of the vehicle relative to the road lane.

3. The system of claim 2 wherein the processor indicates that the center of the vehicle is positioned at the road lane centerline by displaying the at least one filled shape outline at a position with an equal number of empty shape outlines to the left and to the right of the at least one filled shape outline.

4. The system of claim 2 wherein the processor indicates that the center of the vehicle is to a first side of the lane centerline by displaying the at least one filled shape outline at a position with fewer empty shape outlines on the first side of the at least one filled shape outline than empty shape outlines on a second side of the at least one filled shape outline.

5. The system of claim 4 wherein the processor indicates that the center of the vehicle is a first distance from the lane centerline by having a first number of empty shape outlines on the first side of the at least one filled shape outline and the processor indicates that the center of vehicle is a second distance from the lane centerline by having a second number of empty shape outlines on the first side of the at least one filled shape outline wherein the second number is less the first number and the second distance is greater than the first distance.

6. The system of claim 5 wherein the processor further indicates that the center of the vehicle is the first distance from the lane centerline by having a first number of filled shape outlines in the at least one filled shape outline and indicates that the center of the vehicle is the second distance from the lane centerline by having a second number of filled shape outlines in the at least one filled shape outline, wherein the first number of filled shape outlines is less than the second number of filled shape outlines.

7. The system of claim 1 wherein a color of the at least one filled shape outlines indicates a distance that the center of the vehicle is from the center of the road lane.

8. The system of claim 1 wherein a shape of the at least one filled shape outlines indicates a distance that the center of the vehicle is from the center of the road lane.

9. The system of claim 1 wherein the process further determines that a hazard is present on the road ahead of the vehicle and causes the display to depict a set of hazard indicators to convey a position of the hazard, the set of hazard indicators comprising a second plurality of empty shape outlines and at least one second filled shape outline.

10. The system of claim 1 wherein when the system is unable to determine a position of the vehicle relative to the road lane, the processor changes the filled shape outline to an empty shape outline such that all of the position indicators are empty shape outlines.

11. A method comprising:
determining that a position of a vehicle cannot be determined relative to a desired position;
in response to determining that the position of the vehicle cannot be determined relative to a desired position, displaying on a display in a cab of the vehicle a set of shape outlines aligned in a row, each shape outline being empty;
wherein when the position of the vehicle can be determined relative to the desired position, at least one of the shape outlines is filled to indicate the position of the vehicle relative to the desired position.

12. The method of claim 11 wherein when the position of the vehicle can be determined relative to the desired position, multiple shape outlines are filled to indicate the position of the vehicle relative to the desired position.

13. The method of claim 11 wherein when the position of the vehicle can be determined relative to the desired position, the position of the vehicle relative to the desired position is further indicated by a color of the filled shape outline.

14. The method of claim 11 further comprising:
determining there is a hazard in front of the vehicle; and
displaying on the display in the cab of the vehicle an indication of the position of the hazard relative to the vehicle.

15. The method of claim 14 wherein displaying an indication of the position of the hazard comprises displaying:
a second set of shape outlines aligned in a second row; and
filling at least one shape outline to indicate the position of the hazard.

16. A hazard alert system comprising:
a display; and
a processor coupled to the display, the processor:
determining a lateral position of a hazard relative to a vehicle and causing the display to depict a first set of position indicators to convey the lateral position of the hazard relative to the vehicle, the first set of position indicators comprising a plurality of empty shape outlines and at least one filled shape outline;
determining a lateral position of the vehicle relative to a center of a road lane and causing the display to depict a second set of position indicators with the first set of position indicators, the second set of position indicators conveying the lateral position of the vehicle relative to the road lane, wherein the first set of position indicators span larger lateral distance intervals than the second set of position indicators.

17. The hazard alert system of claim 16 in which the plurality of empty shape outlines are depicted in a line.

* * * * *